United States Patent [19]

Tolles

[11] Patent Number: 4,802,898

[45] Date of Patent: Feb. 7, 1989

[54] METHOD AND APPARATUS FOR REMOVING CYANOGEN CHLORIDE FROM AIR

[75] Inventor: Edward D. Tolles, Charleston, S.C.

[73] Assignee: Westvaco Corporation, New York, N.Y.

[21] Appl. No.: 745,082

[22] Filed: Jun. 17, 1985

[51] Int. Cl.$^4$ .............................................. B01D 53/04
[52] U.S. Cl. ............................................ 55/71; 55/74; 55/387; 422/122; 422/177; 423/236; 423/240
[58] Field of Search ......................... 55/71, 74, 387; 422/122, 164, 177, 190, 191; 423/210, 236, 239, 240, 462

[56] References Cited

U.S. PATENT DOCUMENTS

| | | | |
|---|---|---|---|
| 2,511,288 | 6/1950 | Morrell et al. | 502/417 |
| 2,818,323 | 12/1957 | Haensel | 55/74 X |
| 2,920,050 | 1/1960 | Blacet et al. | 252/447 |
| 2,920,051 | 1/1960 | Wiig et al. | 55/74 X |
| 3,355,317 | 11/1967 | Keith, II et al. | 117/100 |
| 3,453,807 | 7/1969 | Taylor | 55/74 X |
| 3,618,295 | 11/1971 | Geiger et al. | 55/71 |
| 3,739,550 | 6/1973 | Martin et al. | 55/74 X |
| 4,040,802 | 8/1977 | Deitz et al. | 55/74 X |
| 4,111,833 | 9/1978 | Evans | 55/71 X |
| 4,204,980 | 5/1980 | Pasha et al. | 55/74 X |
| 4,212,852 | 7/1980 | Aibe et al. | 502/417 X |
| 4,293,317 | 10/1981 | Kovach | 55/71 |
| 4,531,953 | 7/1985 | Groose et al. | 55/74 |

FOREIGN PATENT DOCUMENTS

| | | | |
|---|---|---|---|
| 1575501 | 6/1969 | France | 502/417 |
| 1123822 | 8/1968 | United Kingdom . | |

OTHER PUBLICATIONS

Grabenstetter et al., *Military Problems with Aerosols and Nonpersistent Gases* (Office of Scientific Research and Development (OSRD)), 1946, vol. I, Chapter 4.

*Primary Examiner*—Robert Spitzer
*Attorney, Agent, or Firm*—Terry B. McDaniel; Richard L. Schmalz

[57] ABSTRACT

Cyanogen chloride is removed from air or other gases using a whetlerite type filter which omits chromium and comprises an activated carbon base impregnated with triethylenediamine and optionally copper and silver.

16 Claims, No Drawings

METHOD AND APPARATUS FOR REMOVING CYANOGEN CHLORIDE FROM AIR

The Government has rights in this invention pursuant to Contract No. DAAK11-82-C-0085 awarded by the Department of the Army.

CROSS-REFERENCE TO RELATED APPLICATION

This application has related subject matter to my copending application Ser. No. 713,287, filed on Mar. 18, 1985, entitled "Method and Apparatus for Removing Hydrogen Cyanide and Cyanogen Chloride From Air", also assigned to Westvaco Corporation.

BACKGROUND OF THE INVENTION

1. Field of the Invention

The present invention relates generally to a method and apparatus (individual and collective protection filters) for removal of toxic gases. More particularly, the present invention is directed to an activated charcoal or carbon filter which is especially effective in removing cyanogen chloride from the air.

2. Description of the Prior Art

The use of activated carbon or charcoal which has been impregnated with metals and metal compounds as a filter to remove toxic gases has long been known. During both World Wars I and II, gas masks containing activated charcoal impregnated with copper and copper oxides were used to remove hydrogen cyanide. More recently, combinations of copper, silver and chromium have been employed with activated charcoal to remove such toxic agents as hydrogen cyanide and cyanogen chloride. The copper impregnated charcoal was called whetlerite, after C. Whetzel was instrumental in its development.

Military air filters have employed activated carbon impregnated with various compounds which are effective in removing specific toxic gases not readily controlled by carbon alone. In this country, a chromium catalyst, formed in situ on the carbon has been effectively used against the vapor cyanogen chloride. Use of this catalyst has, however, led to a number of problems.

1. The catalyst looses effectiveness when "aged" under certain conditions of humidity and temperature.
2. Conditions required to form the catalyst including carbon type and processing methods are critical and may be hard to achieve.
3. Chromium is carcinogenic and a potential hazard if carbon dust is inhaled.

Over the years a number of modified compositions have been tried which tend to improve the aging characteristic of the filter with respect to cyanogen chloride removal. These have been based on addition of organic amines to the chromium impregnated product. While a number of different types of amine compounds have been tested, the most effective has been triethylenediamine (TEDA). In the last 10 years the British Military has employed TEDA in combination with chromium salts to augment cyanogen chloride removal by their gas masks.

A search of the prior art has uncovered patents which disclose a variety of agents for enhancing the effectiveness of activated carbon for the selective sorption of gases.

U.S. Pat. No. 4,212,852 to Aibe et al. discloses a method for using activated carbon having supported thereon a metal compound of vanadium, molybdenum or tungsten to deodorize gases containing ammonia, amides and/or hydrogen sulfide.

U.S. Pat. No. 4,111,833 to Evans discloses activated charcoal impregnated with triethylenediamine and a mixture of iodine and potassium to remove iodine from a nuclear reactor effluent stream.

U.S. Pat. No. 4,040,802 to Deitz et al. discloses activated charcoal impregnated with a tertiary amine, such as triethylenediamine and iodine or bromine to remove methyl iodine from a nuclear reactor effluent stream.

U.S. Pat. No. 3,739,550 to Martin et al. discloses activated carbon impregnated with a mixed catalyst which includes a vanadium compound and at least one compound of potassium, lithium or barium to desulfurize carbon dioxide containing waste gases.

British patent No. 1,123,822 discloses activated charcoal impregnated with piperazine or triethylenediamine to remove iodine from nuclear waste effluent.

U.S. Pat. No. 3,355,317 to Keith et al. discloses the use of the oxides of cobalt, copper, zinc, iron and molybdenum on activated carbon to remove hydrogen cyanide from tobacco smoke.

U.S. Pat. Nos. 2,920,050 and 2,920,051, both to Blacet et al. describe the preparation of whetlerite type filters which include copper, chromium, silver and molybdenum impregnants.

In addition to the foregoing prior art patents, the comprehensive 1946 Government study entitled "Military Problems With Aerosols and Nonpersistent Gases", Volume I, sponsored by the Office of Scientific Research and Development (OSRD), describes the use of activated charcoal impregnated with various agents for removing noxious gases. Such uses are principally for gas masks devices.

Authored by Grabenstetter et al., Chapter 4 of the 1946 OSRD reports describing the use of copper, silver, chromium and molybdenum or vanadium impregnants on activated carbon to remove hydrogen cyanide and cyanogen chloride. Numerous organic base impregnations of charcoal are disclosed, including amines such as diethylene triamine and others.

SUMMARY OF THE INVENTION

The present invention is particularly directed to the use of a whetlerite type sorbent which avoids the use of carcinogenic components, such as, chromium. Activated carbon that has been impregnated with triethylenediamine has been found to be particularly effective for gas masks for removing cyanogen chloride and without the need for chromium. The activated carbon also may be impregnated with copper and/or silver for removal of additional toxic gases or vapors.

Another aspect of the present invention is a method for removing cyanogen chloride from air or other gases using a whetlerite type filter material which comprises activated carbon that has been impregnated with aqueous solutions of the soluble salts of copper and silver (type AS), and which additionally contains triethylenediamine (TEDA) as a replacement for chromium. Experiments have been performed to determine suitable impregnation methods and loading levels of TEDA as a replacement for chromium. Loadings of 4–6% TEDA (by weight) have been shown to yield a filter which meets U.S. Military specifications for cyanogen chloride removal, even when compared against the conventional chromium impregnated carbon (type ASC). Performance of the TEDA impregnated filter after "aging" far exceeds that of chromium based material.

The respective amounts of these components present in the impregnating solution are typically as follows:

Copper: up to 20 weight percent, preferably 7 to 15%, for example, as copper carbonate;

Silver: up to 0.5 weight percent, preferably 0.03 to 0.1, added for example as silver nitrate;

Triethylenediamine: 1.0 to 7.5 weight percent, preferably 2 to 6%.

The precursor filter material used in the present invention can be conventionally prepared in accordance with the procedures described by the two patents to Blacet et al. (U.S. Pat. Nos. 2,920,050 and 2,920,051). Thus, activated carbon particles are impregnated with solutions of the respective salts of copper and silver, followed by drying. Typical procedures and formulations for copper and silver impregnations are also described by Grabenstetter et al. in the 1946 OSRD report, supra, which is incorporated herein by reference. Drying of the initially impregnated carbon can be carried out in a fluidized bed, oven, or air stream at temperatures of about 200° to 600° F. preferably about 350° to 450° F. It is also desirable first to dry the initially impregnated carbon at a lower temperature (225°–275° F.) followed by heat treatment at a higher range (350° to 600° F.). Thereafter, impregnation with TEDA can be carried out by adding an aqueous solution of the amine to the metal impregnated carbon, followed by drying at about 150° F. to 300° F.

DESCRIPTION OF THE PREFERRED EMBODIMENTS

The following description and examples provide details of the manner in which the embodiments of the present invention can be made and used to effectively remove cyanogen chloride from air without the presence of chromium. The examples shown are based on actual experimental work. While exemplary of the present invention, the examples should not be construed as specifically limiting the invention and such variations which would be within the purview of one skilled in the art are to be considered to fall within the scope of the invention.

PREPARATION OF IMPREGNATED SAMPLES

Samples were prepared in which triethylenediamine (TEDA) was added to a whetlerite type filter material impregnated with copper and silver (type AS). The first set of AS/TEDA samples which were prepared (samples 83-003 through 83-014) were made from various precursor carbons and employed a range of TEDA loadings to test the effects of these variables on cyanogen chloride protection. The steps involved in sequentially impregnating, drying and heat-treating the base material, and impregnating with TEDA are described below. The resulting fully impregnated carbon samples were used to evaluate the effect of TEDA on cyanogen chloride life in the absence of chromium. Activated carbons were impregnated with a solution containing soluble copper and silver salts. The carbon contained about 7.5% copper and 0.05% silver. The product was dried in a forced air oven at 300°–370° F.

The dried AS carbon then was impregnated with TEDA by adding an aqueous solution of the amine to give a series of products with TEDA loadings ranging from 1.5% to 7.5% (by weight).

Some samples were prepared by spraying an aqueous TEDA solution onto the carbon and others were made by soaking it with the TEDA solution. In all TEDA impregnations, the final product was dried at 110° C. for 3 hours.

A second set of AS/TEDA samples, including sample numbers 83-102 through 83-112, was prepared using the fluid bed processing conditions shown in TABLE 1 for heat treatment of the AS precursor. The fluid bed method of heat treatment provides improved ammonia desorption characteristics compared to the treatment in the forced air oven.

TABLE 1

| Fluid Bed Processing Conditions For Heating Type AS Material | |
| --- | --- |
| Fluid-bed vessel diameter (inches) | 4.0 |
| Fluidizing velocity (ft/sec) | 2.0 |
| Test mode | Batch |
| Residence Time (min.) | 5 and 10 |
| Atmosphere | Air and simulated flue gas |
| Temperatures (°F.) | 275 and 375 |

As shown in TABLE 2, samples 003–007 were based on carbon impregnated with the AS solution and supplemented with TEDA applied by spraying amounts ranging from 1.5% to 7.5%. The precursor type AS whetlerites were conventionally prepared using the forced air oven. Maximum benefit of TEDA is obtained for amounts of 4.5% and greater. At such loadings the cyanogen chloride life of original samples appears to be dependably above 40 minutes (min) and aging had no detrimental effect.

TABLE 2

| Cyanogen Chloride Life Comparison for Type AS Carbons Impregnated With TEDA | | | | |
| --- | --- | --- | --- | --- |
| Sample No. 83-( ) | % TEDA | Method | Original Life (Min) | Aged Life (Min) |
| 003 | 1.5% | Spray | 37.1 | 27.5 |
| 004 | 3.0% | Spray | 40.9 | 34.4 |
| 005 | 4.5% | Spray | 40.7 | 56.1 |
| 006 | 6.0% | Spray | 46.2 | 41.0 |
| 007 | 7.5% | Spray | 42.1 | 44.7 |
| 008 | 3.0% | Soak | 33.2 | 29.1 |
| 009 | 6.0% | Soak | 39.8 | 41.1 |
| 010 | 6.0% | Spray | 40.9 | 35.0 |
| 011 | 6.0% | Spray | 40.0 | 35.0 |
| 012 | | | nil | nil |
| 013 | | | nil | nil |

Results for a second set of samples, for which the type AS whetlerite precursor was made using fluid bed heat treatment, are shown in TABLE 3. These products were all made with a 6% TEDA loading. A number of different heat treatment temperatures were used ranging from 275° to 800° F., and effects of both air and flue gas as purge gases were tested.

For the AS/TEDA products the average original cyanogen chloride life for 8 samples was 42.9 min. After aging, the cyanogen chloride life was 39.8 min.

TABLE 3

| Cyanogen Chloride Life Of Chromium-Free Products Containing 6% TEDA | | | | | |
| --- | --- | --- | --- | --- | --- |
| Sample No. (83-( )) | Sample | Atm | Temp. | Cyanogen Chloride Life (Min.) | |
| | | | | Org Avg. | Aged Avg. |
| 102 | AS/TEDA | FG** | 275° F. | 45.0 | 38.3 |

TABLE 3-continued

Cyanogen Chloride Life Of Chromium-Free Products Containing 6% TEDA

| Sample No. (83-( ) | Sample | Atm | Temp. | Org Avg. | Aged Avg. |
|---|---|---|---|---|---|
| 103 | | | 300° | 41.9 | 36.4 |
| 104 | | | 350° | 40.9 | 34.2 |
| 105 | | | 400 | 39.6 | 39.7 |
| 106 | | | 500 | 40.7 | 39.4 |
| 107 | | | 650 | 44.9 | 50.5 |
| 108 | | | 800 | 48.1 | 39.6 |
| 109 | | Air | 350 | 42.3 | 40.2 |
| | | | | Avg. 42.9 | Avg. 39.8 |
| 110 | | Air | 350 | 36.8 | 35.5 |
| | | | | Avg. 36.8 | Avg. 35.5 |
| 111 | | Air | 350 | 30.4 | 29.0 |
| 112 | | FG | 350 | 29.2 | 32.0 |
| | | | | Avg. 29.8 | Avg. 30.5 |

**Flue Gas

From the foregoing, it will be seen that the use of TEDA as an impregnating agent with Type AS whetlerites yields improved cyanogen chloride protection. Thus, TEDA can replace chromium and eliminate the various problems associated with the use of this metal.

Although only preferred embodiments are specifically illustrated and described herein, it will be appreciated that many modifications and variations of the present invention are possible in light of the above teachings and within the purview of the appended claims without departing from the spirit and intended scope of the invention.

It will also be appreciated that the experiments conducted and reported herein involve Type AS whetlerites since this is the material most suitable for use for protection against a variety of gases. However, it should be understood that the use of TEDA as a chromium substitute with charcoals other than Type AS is also contemplated since the effectiveness of TEDA alone has been amply demonstrated for removal of cyanogen chloride from air streams.

What is claimed is:

1. In a method for removing cyanogen chloride from an air stream containing cyanogen chloride using a carbon containing filter, the improvement comprising said carbon having an effective amount of triethyleneamine added thereto in the absence of chromium.

2. The method of claim 1 wherein said triethylenediamine is present in an amount ranging from about 1.0 to about 7.5 weight %.

3. The method of claim 1 wherein said triethylenediamine is present in an amount ranging from about 4 to about 6 weight %.

4. The method of claims 1, 2 or 3 wherein said carbon further includes up to 20 weight percent copper.

5. The method of claims 1, 2 or 3 wherein said carbon further includes up to 0.5 weight percent silver.

6. The method of claims 1, 2 or 3 wherein said carbon further includes copper and silver.

7. The method of claims 1, 2 or 3 wherein said carbon further includes from about 5 to about 20 weight percent copper and from about 0.03 to about 0.1 weight percent silver.

8. Gas mask device for removing cyanogen chloride gas from an air stream containing cyanogen chloride comprising housing means containing carbon particles impregnated with an amount of triethylene-diamine for effectively removing cyanogen chloride in the absence of chromium.

9. The device of claim 8 further including up to 20 weight percent copper.

10. The device of claim 9 wherein the copper content is from about 5 to about 20 weight percent.

11. The device of claim 8 further including up to 0.5 weight percent silver.

12. The device of claim 11 wherein the silver content is from about 0.03 to about 0.1 weight percent.

13. The device of claim 8 further including copper and silver.

14. The device of claims 8, 9, 11, 13, 10, or 12 wherein the triethylenediamine content is from about 1.0 to about 7.5 weight percent.

15. The device of claims 8, 9, 11, 13, 10, or 12, wherein the triethylenediamine content is from about 2 to 6 weight percent.

16. Type AS whetlerite charcoal impregnated with triethylenediamine in an amount effective for removing cyanogen chloride from an airstream containing cyanogen chloride.

* * * * *